United States Patent
Hermann et al.

(10) Patent No.: US 7,144,346 B2
(45) Date of Patent: Dec. 5, 2006

(54) STEERING MECHANISM WITH PLANETARY GEAR SYSTEM AND DRIVE FOR IMPRESSING SPECIFIC HAND TORQUE ON THE STEERING WHEEL

(75) Inventors: Jochen Hermann, Geisslingen (DE); Klaus von Hammel, Stuttgart (DE); Roman Frank Starbek, Esslingen (DE); Harwin Niessen, Kirchheim u. Teck (DE); Martin Vohmann, Esslingen-Zell (DE)

(73) Assignee: Thyssen Krupp Presta SteerTec GmbH (DE)

( * ) Notice: Subject to any disclaimer, the term of this patent is extended or adjusted under 35 U.S.C. 154(b) by 127 days.

(21) Appl. No.: 10/498,618

(22) PCT Filed: Dec. 2, 2002

(86) PCT No.: PCT/EP02/13603

§ 371 (c)(1),
(2), (4) Date: Jun. 10, 2004

(87) PCT Pub. No.: WO03/053764

PCT Pub. Date: Jul. 3, 2003

(65) Prior Publication Data

US 2005/0037884 A1     Feb. 17, 2005

(30) Foreign Application Priority Data

Dec. 11, 2001   (DE)   ................. 101 60 717

(51) Int. Cl.
   *B62D 11/06*      (2006.01)

(52) U.S. Cl. .......................... 475/19; 475/25

(58) Field of Classification Search ................. 475/19, 475/25; 180/443, 446
See application file for complete search history.

(56) References Cited

U.S. PATENT DOCUMENTS

| | | | | |
|---|---|---|---|---|
| 2,925,741 | A | * | 2/1960 | Winkelmann ........... 74/388 PS |
| 4,556,116 | A | | 12/1985 | O'Neil |
| 4,577,716 | A | * | 3/1986 | Norton ........................ 180/446 |
| 4,658,927 | A | * | 4/1987 | Kanazawa ................... 180/422 |
| 4,751,976 | A | | 6/1988 | Higuchi et al. |
| 5,205,371 | A | | 4/1993 | Karnopp |
| 5,236,335 | A | | 8/1993 | Takeuchi et al. |
| 6,219,604 | B1 | | 4/2001 | Dilger et al. |
| 6,712,174 | B1 | | 3/2004 | Bohner et al. |
| 6,896,090 | B1 | * | 5/2005 | Kanda et al. ............... 180/402 |

* cited by examiner

*Primary Examiner*—Ha Ho
(74) *Attorney, Agent, or Firm*—Robert W Becker & Associates; Robert W Becker

(57) ABSTRACT

A motor vehicle steering mechanism is provided and includes a steering wheel fixedly connected to a steering column, a steering pinion meshing with a rack, a planetary gear system connected to the steering column and the steering pinion, wherein during a normal trouble-free driving operation the housing of the gear system is freely rotatable; an angle sensor detects the position of the steering column and/or steering wheel and generates a signal representative thereof, wherein a first drive applies torque directly to the steering column, and a second drive acts on the steering pinion or rack. The signal from the angle sensor is an input signal for an electronic control system that controls the second drive. A torque adjuster controls the first drive such that a hand torque corresponding to a driving situation is Produced for achieving a defined driving sensation for the driver on the steering wheel.

11 Claims, 3 Drawing Sheets

STEERING MECHANISM WITH PLANETARY GEAR SYSTEM AND DRIVE FOR IMPRESSING SPECIFIC HAND TORQUE ON THE STEERING WHEEL

BACKGROUND OF THE INVENTION

The present invention relates to a motor vehicle steering.

A generic-type steering mechanism is known from DE 40 31 316 A1. Here, a superimposing gear is proposed in the steering column, a gear which, depending on the steering angle velocity, superimposes an additional steering angle, by means of an electric motor, onto the steering gear connected to the output side of the gear and therefore the steered wheels. Therefore the gearing ratio of the steering mechanism can be varied. In addition, steering intervention can occur independently of the driver's wishes when a stability control program kicks in.

These additional steering interventions cause an additional independent turning of the steering wheel due to the interconnection between steering wheel and steering gear. Therefore the input side of the superimposing gear must be assisted during the autonomous steering intervention.

Torque suddenly arising in this way is disadvantageous. In particular the system is virtually ineffective if the driver does not have a hand on the steering wheel or the steering wheel for example is only held with very little force while driving straight ahead.

It is therefore an object of the present invention to improve a generic-type steering mechanism in such a way that reactions of autonomous steering intervention can be reduced or completely compensated for and production of hand torque corresponding to the driving situation can be achieved as simply as possible.

SUMMARY OF THE INVENTION

This object is achieved according to the invention by a steering mechanism having a steering wheel that is fixedly connected to a steering column; a steering pinion that meshes with a rack; a planetary gear system having an input side connected to the steering column and an output side connected to the steering pinion, wherein the planetary gear system has a housing that during a normal trouble-free driving operation is freely rotatable; an angle sensor for detecting the position of the steering column and/or the steering wheel and for generating a signal representative of such position; a first drive for direct application of torque to the steering column; a second or further drive for acting on the steering pinion or the rack; an electronic control system for controlling the second drive, wherein a signal from the angle sensor is an input signal for the control system; and a torque adjuster or control means for controlling the first drive such that a hand torque corresponding to a driving situation is produced for achieving a defined driving sensation for the driver on the steering wheel.

As regards the adjustment and control concept, the motor vehicle steering mechanism according to the invention basically concerns a steer-by-wire steering mechanism, in which case however mechanical linkage is provided between the steering wheel and the steered wheels for emergency use, that is to say in case of failure of the hand torque controller or the position adjuster for the steering rack and/or wheel adjustment. De-coupling between hand torque controller and position adjuster is advantageously achieved as a result of the planetary gear housing being mounted in such a way that it is freely rotatable. The adjustment and/or control systems below and above the planetary gear system do not therefore interfere with one another or only slightly, since movements on the input or output shaft are compensated by turning of the planetary gear housing, without such turns becoming substantially noticeable on the other shaft.

Fail-safe mechanical linkage is ensured in a state of malfunction if the housing is stopped in the event of trouble. This takes place advantageously by means of frictional or positive engagement. The frictional engagement can be realized for example by means of a disc or drum brake. The frictional engagement however can also take place by means of two coupling discs, which in the state of malfunction are compressed against one another by springs. In normal trouble-free driving operation a coupling element is adjusted against the spring force with the aid of a coil based on the electromagnetic principle, whereby the coupling is disengaged and the housing of the planetary gear system is free to rotate. A coupling element can be advantageously integrated for example into the housing, attached thereto or formed by this itself. A positive engagement on the other hand can be realized for example by means of toothed coupling elements. Also it is possible to provide spring-tensioned pins, in the event of failure of a component the springs automatically forming a positive engagement with the housing, wherein they lock for example in a recess or in borings of the housing.

Advantageously, the hand torque is generated by means of a drive, whereby if a torque sensor is present torque adjustment can be provided. If no torque sensor is present, the hand torque may also be adjusted by means of a torque control system. In this case the drive acts on the steering rack between the planetary gear system and the steering wheel. The drive for the torque-adjusted steering column is, from a control technology point of view, to be arranged as closely as possible on the steering column and the steering wheel.

As a result of the freely rotating housing of the planetary gear system, which is advantageously designed as a planetary gear, the cinematic relations of the planetary gear system for the torque adjuster and/or the torque control system no longer have to be taken into consideration either in normal driving operation or in the event of intervention by a vehicle stability program (ESP), whereby the form of the control algorithm is not particularly complex and the torque adjuster can be optimized with relatively little problem. In the simplest case, the torque adjuster is a PID controller. However, it is equally possible to design the torque adjuster as a state controller.

If a vehicle stability program superimposes an additional steering angle, the rack of the position adjuster is adjusted accordingly by the servo-drive. A reaction on the steering wheel is compensated to a large extent by the freely rotating housing of the planetary gear system and totally with the aid of the hand torque control and/or adjustment system so that advantageously the person steering the vehicle does not feel the autonomous steering intervention by the vehicle stability program. In a particular embodiment it is also, however, possible without any problem to inform the person, in particular during the autonomous steering intervention by the vehicle stability program, of its activity via the steering wheel. For this purpose, an additional hand torque or torque progression can be superimposed over the normal hand torque, similar to the vibrating and/or shaking of the brake pedal in the event of response by the ABS, as a consequence of which vibration on the steering wheel can be felt for example.

The drive for generating the hand torque is advantageously actively connected by means of a non-self-locking gear to the steering column or directly to the steering wheel, so that even in the event of failure of the drive and mechanical linkage from the steering wheel to the steering pinion the steering wheel can be steered by the driver.

BRIEF DESCRIPTION OF THE DRAWINGS

An embodiment of a motor vehicle steering mechanism according to the invention is described in detail below on the basis of figures, wherein.

DESCRIPTION OF SPECIFIC EMBODIMENTS

Figure 1:
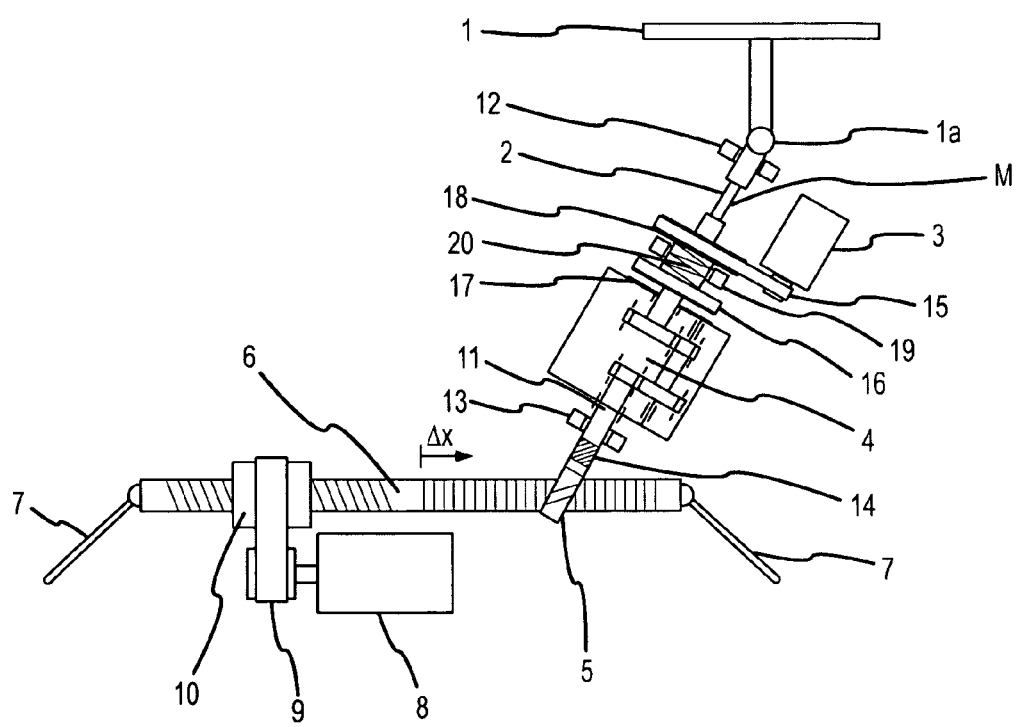
FIG. 1 shows in a schematic diagram a motor vehicle steering mechanism according to the invention.

In FIG. 1 a motor vehicle steering mechanism according to the invention is schematically illustrated. The steering mechanism has a steering wheel 1, which rigidly acts for example by means of a universal joint 1a on an input shaft 2 of a planetary gear system 4. The planetary gear system 4 also has an output shaft 11, which is connected to a steering pinion 5. The steering pinion 5 as presently known in turn meshes with a steering rack 6, which causes a wheel angle change of the steered wheels in the vicinity of the steered axle of a motor vehicle by means of track rods 7 when the steering pinion 5 is turned.

The planetary gear system 4, which can be designed as a planetary gear, supports a drive 3 on an outer side in the form of an electric motor, which moves the steering column 2 by means of a belt drive 15, 18. An electric servo-drive 8 is assigned to the steering rack 6 and by means of a pinion 9 and a toothed belt acts on a circulating ball 10, which engages with a thread adapted thereto, so that a turn of the circulating ball 10 likewise causes a displacement Δx of the steering rack 6 and thus a wheel angle change.

Figure 2:
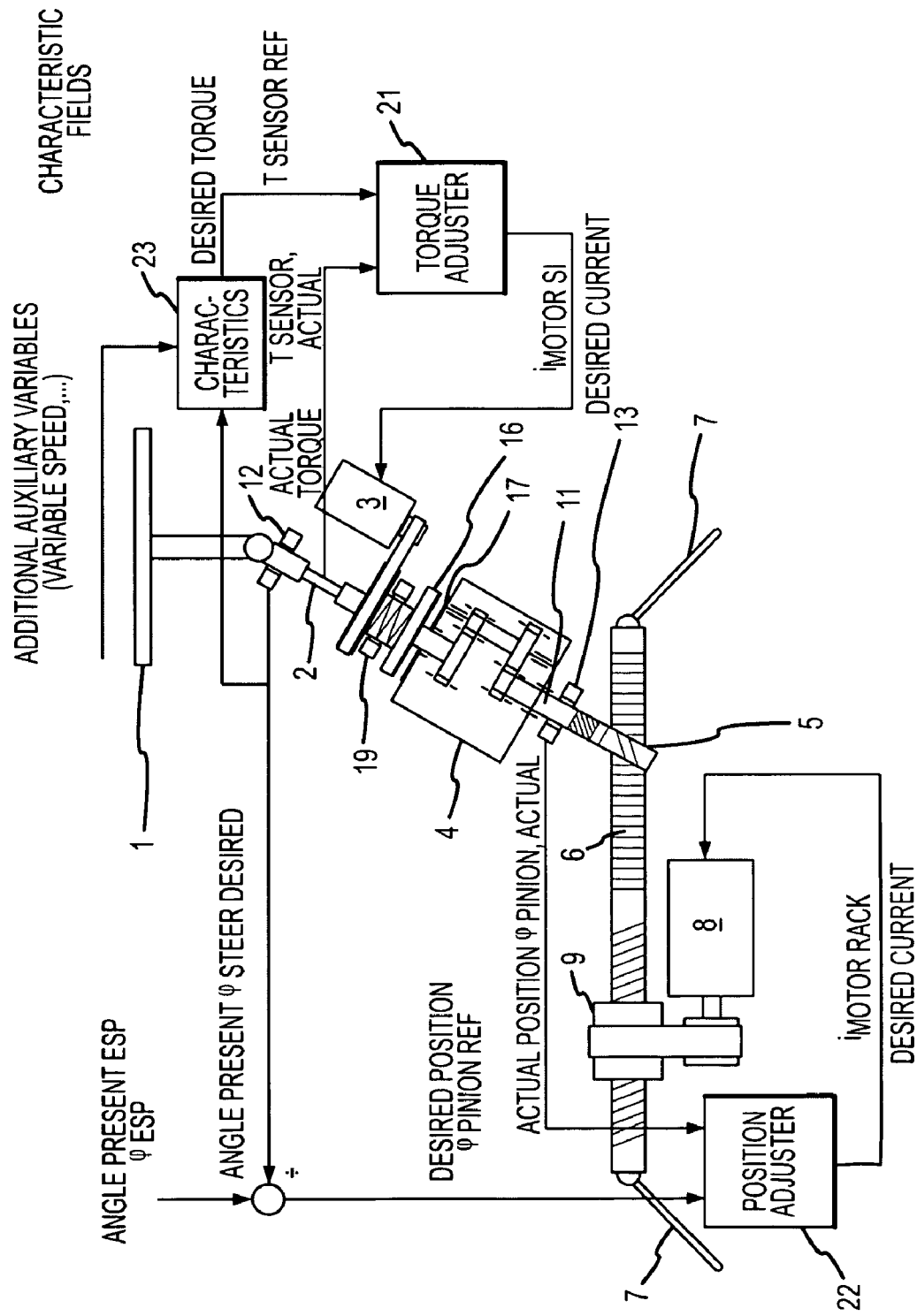
FIG. 2 a motor vehicle steering mechanism according to FIG. 1 with associated control concept.

An angle sensor 12 arranged on the steering column 2 determines the position of the steering wheel 1 and generates a corresponding signal, which as shown in FIG. 2 is fed to the position adjuster 22 for adjustment of the steering rack 6, as well as the torque adjuster 21, 23 for adjustment of the hand torque. A torque sensor M is also arranged in the steering column 2, which determines the hand torque impressed on the steering wheel 1. The signals of the torque sensor M likewise represent an input quantity of the torque adjuster 21. If instead of a torque adjustment system a torque control system is used, the torque sensor M can be dispensed with.

So that mechanical linkage from the steering wheel 1 to the steering pinion 5 is possible in the event of a fault, the housing of the planetary gear system 4 is stopped if a fault occurs. A coupling, the coupling elements 16, 17 of which are compressed together in the event of malfunction by means of a spring force 20, serves this purpose. Either positive or frictional engagement can be produced by compressing the coupling elements 16, 17 together. In normal trouble-free driving operation, a current-conducting coil produces a magnetic field, as a result of which coupling element 16 is held against the spring force 20 away from the coupling element 17, so that the housing of the planetary gear system 4 can rotate freely. In the event of a fault the coil 20 does not conduct current, whereby the spring 20 compresses coupling elements 16, 17 against one another. Positive engagement can be easily obtained for example by teeth of the coupling elements.

A damping element 14 can be arranged between steering pinion 5 and output shaft 11 of the planetary gear system 4 for better de-coupling of position adjuster 22 and torque adjusters 21, 23.

Depending on the control concept and presence of a torque sensor the hand torque is either controlled (no torque sensor available) or adjusted (torque sensor available). For torque adjustment, measurement of at least a torque in the section between the pinion and the steering wheel is necessary.

As illustrated in FIG. 2, the turn of the steering wheel 1 is sensed by means of the angle sensor 12, which produces the desired quantity $\phi_{steer,\ desired}$. This desired quantity is at the same time the input quantity for the characteristic field 23. Possible additional auxiliary variables, for example vehicle speed, may serve as additional input quantities for the characteristic field 23, by means of which the reference signal $T_{sensor,\ ref}$ (desired torque) is produced and the input quantity for the torque control system 21, which produces the control quantity $i_{motor,\ SI}$ for the drive 3. Because the housing of the planetary gear system can rotate freely, turning of the pinion 5 does not or only slightly influences the hand torque. On the other hand turning of the steering column 2 by the drive 3 does not cause a disruptive torque on the steering pinion 5. Therefore the position adjuster 22 is de-coupled by the torque control, which serves to adjust the steering rack 6. The steering rack 6 is connected via the track rods 7 to the steered wheels (not shown), as a result of which adjustment of the rack 6 leads to adjustment of the steered wheels. The auxiliary angle $\phi_{ESP}$ is locked on the desired quantity $\phi_{steer,\ desired}$. The sum of these two angle quantities is an input quantity $\phi_{pinion,\ ref}$ of the position adjuster 22. A further input quantity of the position adjuster 22 is either the position of the pinion 5 or the position of the steering rack 6. In FIG. 2 the angle position of the pinion 5 is measured by means of the angle sensor 13, whereby the angle sensor 13 transmits the actual signal $\phi_{pinion,\ actual}$ to the position adjuster 22. The position adjuster 22 produces the desired current $i_{motor,\ rack}$, which serves to control the rack motor 8.

The torque control illustrated in FIG. 2 as input quantity has the hand torque on the steering wheel 1, which arises by means of the torque sensor M, generating the signal $T_{sensor,\ actual}$. The torque sensor M can be arranged at any arbitrary place in the steering mechanism above the planetary gear system 4. However, it is expedient to arrange the sensor M as tightly as possible on the steering wheel 1, so that the torque adjuster 21 can be realized as simply as possible.

Figure 3A:
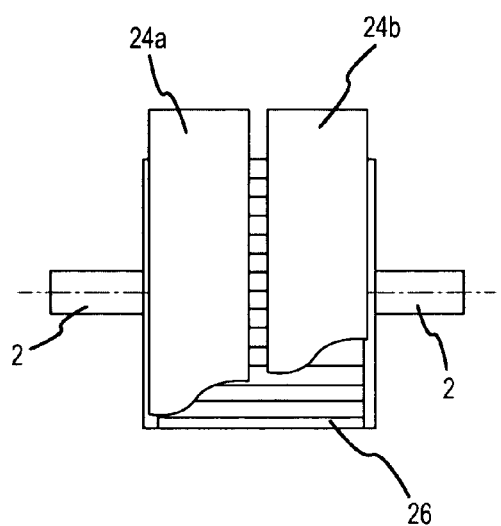
FIG. 3a a hollow shaft motor for direct drive of and 3b the steering column.
Figure 3B:
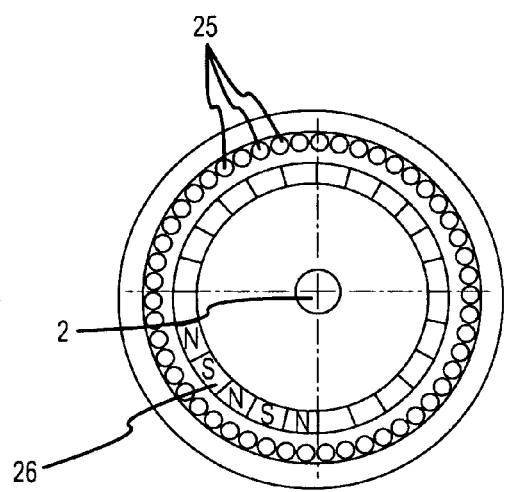

FIGS. 3a and 3b show two different views of an alternative drive for generating the hand torque by means of two electric motors 24a, 24b, the common rotor 26 of which is rigidly connected to the steering column 2. They form a redundant system, whereby the motors 24a, 24b are so dimensioned that one motor can generate the hand torque in each case.

The specification incorporates by reference the disclosure of PCT/EP02/13603 filed Dec. 2, 2002 and German priority document 101 607 17.2 filed Dec. 11, 2001.

The present invention is, of course, in no way restricted to the specific disclosure of the specification and drawings, but also encompasses any modifications within the scope of the appended claims.

The invention claimed is:

1. A motor vehicle steering mechanism, comprising:
a steering wheel fixedly connected to a steering column;
a steering pinion that meshes with a rack;

a planetary gear system having an input side connected to said steering column and an output side connected to said steering pinion, wherein said planetary gear system has a housing that during a normal trouble-free driving operation is freely rotatable;

an angle sensor for detecting the position of at least one of said steering column and said steering wheel and for generating a signal representative of such position;

a first drive for direct application of torque to said steering column;

a second drive for acting on said steering pinion or said rack;

an electronic control system for controlling said second drive, wherein the signal from said angle sensor is an input signal for said control system; and a control means for controlling said first drive such that a hand torque corresponding to a driving situation is produced for achieving a defined driving sensation for a driver on said steering wheel.

2. A steering mechanism according to claim 1, wherein a brake means is provided for effecting at least one of decelerating and stopping said housing of said planetary gear system.

3. A steering mechanism according to claim 1, which includes means for positively or frictionally blocking a movement of said housing of said planetary gear system upon disruption of said first drive or of components associated therewith.

4. A steering mechanism according to claim 1, which includes means for blocking a relative movement between said housing of said planetary gear system and said steering column, or between said housing and said steering pinion, upon disruption of said first drive or of components associated therewith.

5. A steering mechanism according to claim 1, wherein a torque sensor M is provided for detecting a hand torque impressed upon said steering wheel and for generating a representative signal.

6. A steering mechanism according to claim 5, wherein said control means is in the form of a torque adjuster that controls said first drive on the basis of at least one of said signal from said angle sensor and the signal from said torque sensor M.

7. A steering mechanism according to claim 6, wherein further vehicle condition parameters form input quantities for said torque adjuster.

8. A steering mechanism according to claim 1, wherein said first drive is a hollow shaft motor having a rotor that is fixedly connected with said steering column.

9. A steering mechanism according to claim 1, wherein said first drive drives said steering column by means of least one of an intermediate gear mechanism and belts.

10. A steering mechanism according to claim 9, wherein said belts are toothed belts.

11. A steering mechanism according to claim 1, wherein a further redundant drive is provided for producing hand torque in the event of failure or malfunction of said first drive.

* * * * *